United States Patent [19]

Randeri et al.

[11] 3,873,696

[45] Mar. 25, 1975

[54] CLEANING AND STERILIZING SOFT CONTACT LENS

[75] Inventors: Kiran J. Randeri, Santa Ana; Hampar L. Karageozian, Altadena, both of Calif.

[73] Assignee: Allergan Pharmaceuticals, Irvine, Calif.

[22] Filed: Jan. 31, 1972

[21] Appl. No.: 222,379

[52] U.S. Cl............................ 424/153, 8/111, 21/58, 252/94, 252/188, 424/162
[51] Int. Cl............................................. A01n 11/00
[58] Field of Search.................. 424/162, 149, 153; 252/106, 94, 188, 188.9 R; 21/58; 8/111

[56] References Cited
UNITED STATES PATENTS 3,240,709   3/1966   Rankin............................... 252/106

OTHER PUBLICATIONS

"A new type peroxygen composition –OXONE – monopersulfate compound," Dupont, Wilmington, Del. January 1961.

*Primary Examiner*—Stanley J. Friedman
*Assistant Examiner*—D. W. Robinson
*Attorney, Agent, or Firm*—Martin A. Voet

[57] ABSTRACT

This invention is a composition and method of cleaning and sterilizing hydrophilic ("soft") contact lenses with an aqueous, isotonic solution containing an effective amount of water soluble oxygen releasing salt such as potassium peroxymonosulfate. The effectiveness of the foregoing solution may be enhanced by the addition of an inorganic chloride ion releasing salt such as sodium chloride and further enhanced by the addition of a reducing agent.

2 Claims, No Drawings

CLEANING AND STERILIZING SOFT CONTACT LENS

BACKGROUND OF THE INVENTION

Hydrophilic or partially hydrophilic plastic materials have been described for use in making contact lenses. For example, U.S. Pat. No. 3,503,393 to Seiderman and U.S. Pat. No. 2,976,576 to Wichterle describe processes for producing three dimensional hydrophilic polymers in aqueous reaction media having a sparingly cross-linked polymeric hydrogel structure and having the appearance of elastic, soft, transparent hydrogels.

The main virtues of these lenses is their softness and optical suitability. The lenses are particularly useful in ophthalmology dur to their remarkable ability to absorb water with a concomitant swelling to a soft mass of extremely good mechanical strength, complete transparency and the ability to retain shape and dimensions when equilibrated in a given fluid.

One of the problems connected with these "soft" contact lenses is the method of their sterilization and cleaning. The very property of the soft lenses which allows them to absorb up to 150 percent by weight of water also allows preservatives which might otherwise be used for cleaning and sterilization to be absorbed and even concentrated and later released when the soft contact lens is on the eye. This can have the harmful result of damaging or staining the contact lens itself and/or harming the sensitive tissues of the conjunctivae or cornea.

Hard contact lenses do not absorb water and thus the use of effective preservatives does not create a problem in the hard contact lens field. As stated in the medical publication "Highlights of Ophthalmology," Vol. XII, Nov. 3, 1969, sterilization and cleaning of soft contact lenses is presently carried out by boiling the lenses in water for 15 minutes; a rather inconvenient and dangerous operation. Furthermore, users of soft contact lenses are warned that under no circumstances should solutions designed for hard contact lenses be used, for the reason that the preservatives in such solutions will be absorbed and even concentrated by the soft lens and may seriously damage the soft lens and/or the eye of the user.

SUMMARY OF THE INVENTION

It has now been discovered unexpectedly that soft contact lenses may be effectively cleaned, sterilized and used without deleterious effect to the lens or the eyes of the user by contacting the lens with a sterile, aqueous, isotonic, solution containing an effective amount of a water soluble oxygen releasing salt. The effectiveness of the foregoing composition may be enhanced also without deleterious effect to the lens or the eyes, by including in the above described composition an effective amount of an inorganic chloride releasing salt. The effectiveness of the foregoing compositions may be further enhanced, also without deleterious effect to the lens or the eyes, by including an effective amount of a reducing agent.

DESCRIPTION OF THE INVENTION

The oxygen releasing salts which may be used in the present invention are water soluble, colorless, non-toxic salts such as, for example, the sodium, potassium, calcium, magnesium, lithium and ammonium salts of oxygen releasing sulfur compounds, such as, for example, the thiosulfates ($S_2O_3^{-2}$), the persulfates ($SO_5^{-2}$) and the peroxydisulfates ($S_2O_8^{-2}$); and chlorine compounds, such as, for example, the hypochlorites ($ClO^-$), the chlorites ($ClO_2^-$), the chlorates ($ClO_3^-$), the perchlorates ($ClO_4^-$).

The preferred oxygen releasing salt is potassium peroxymonosulfate ($KHSO_5$) and the preferred form of this compound is the triple salt which is a combination of potassium peroxymonosulate ($KHSO_5$), potassium hydrogen sulfate ($KHSO_4$) and potassium sulfate ($K_2SO_4$). This composition is an acidic, water soluble, oxygen releasing powder which is odorless, white, granular, stable and free flowing, having the following characteristics:

| | |
|---|---|
| Formula | $2KHSO_5 \cdot KHSO_4 \cdot K_2SO_4$ |
| Active Oxygen | 4.5% min. |
| Color, form | White, granular powder |
| Odor | None |
| Bulk Density | 70–75 lb/cu.ft. 1.12–1.20 g/cc |
| Particle Size | |
| Through 20 mesh | 100% |
| Through 200 mesh | 10% |
| pH, 25°C. | |
| 1% solution | 2.3 |
| 3% solution | 2.0 |
| Solubility, 20°C. | 25.6 g./100 g. water |
| Moisture Content | 0.1% max. |
| Stability | <1% active oxygen loss/month |
| Standard Electrode Potential (E°) | −1.44 volts |
| Heat of Decomposition | 33 BTU/lb. |
| Thermal Conductivity | 0.08 BTU/ft/°F./Hr. |
| Tradename | "Oxone" (Du Pont) |

The amount of oxygen-releasing salt which may be used in the present invention ranges from about 0.001 to about 1 percent by weight and preferably from about 0.005 to about 0.1 percent by weight.

While the preferred oxygen releasing triple salt, Oxone, is a safe and effective soft contact lens cleaning and sterilizing agent as shown by the Examples below, Oxone substantially decomposes rapidly at physiological pH, i.e., within about 8 hours. Thus, while Oxone is safe and effective, it has no long lasting activity. Similarly, the other disclosed oxygen releasing salts tend to have limited effectiveness over extended periods of time, i.e., more than about a day.

It has now been discovered that the effectiveness of the foregoing soft cleaning and sterilizing composition may be prolonged by the addition of a chloride ion releasing salt. As shown in the Examples below, a composition containing an oxygen releasing salt such as Oxone in combination with one of the chloride ion releasing salts of the present invention is bactericidal and bacteristatic after 31 days. It was also unexpectedly found that when the chloride ion releasing salt is used in combination with the oxygen releasing salt, the same bactericidal and bacteristatic levels may be maintained with a lower concentration of oxygen releasing salt.

The chloride ion releasing salts which may be used in the present invention are water soluble, non-toxic, colorless inorganic salts such as, for example, sodium chloride (NaCl), potassium chloride (KCl), calcium chloride ($CaCl_2$), magnesium chloride ($MgCl_2$), lithium chloride (LiCl) and ammonium chloride ($NH_4Cl$).

The amount of chloride ion releasing salts which mayy be used in the present invention range from about 0.001 to about 2.0 percent by weight and preferably from about 0.005 to about 0.9 percent by weight.

It has further been discovered that the effectiveness of the foregoing soft lens cleansing and sterilizing composition may be improved by the addition of a non-toxic reducing agent. The term "reducing agent" in the context of this invention means those compounds which have an oxidation potential of less than the oxidation potential of the oxygen-releasing salt. Thus percarbonate is one of the oxygen-releasing salts described in the present invention, yet percarbonate is a reducing agent in the presence of Oxone because Oxone has a higher oxidation potential than percarbonate. The reducing agents of the present invention may be organic or inorganic. Examples of suitable reducing agents include reducing sugars such as dextrose and reducing vitamins such as ascorbic acid. Organic reducing agents such as the foregoing are slow acting and tend to have a longer effect. Suitable faster acting inorganic reducing agents include the water soluble salts of the thiosulfates, e.g., sodium and potassium thiosulfate.

The amount of reducing agent which may be used in the present invention varies from about 0.001 to about 0.1 percent and preferably 0.005 to 0.05 percent by weight.

A typical composition of the present invention may contain, in addition to the compounds described earlier, lubricants to aid in making the ophthalmic cleaning composition more comfortable to the user. Conventional lubricants, binders and excipients may be used and include glycerol, sorbitol, boric acid, propylene glycol, carboxymethylhydroxy-methylcellulose, hydroxyethylcellulose, polyethylene glycols, dextran, methylcellulose, polyvinylpyrrolidine, polyvinylalcohol, water soluble salts of carboxymethylcellulose, or naturally occurring hydrophilics such as gelatin, alginates, tragacanth, pectin, acadia and soluble starches. These materials are used in amounts varying between 0.01 and 10 and preferably between about 0.1 and 5 weight percent.

Suitable buffers or stabilizers may also be used and include sodium or potassium citrate, citric acid, various mixed phosphate buffers and $NaHCO_3$. Generally $NaHCO_3$ may be used in amounts ranging from about 0.05 to 2.5 percent and preferably 0.1 to 1.5 by weight, the narrow limits resulting from the pH effect of the $NaCHO_3$. With suitable buffering agents, greater amounts of $NaHCO_3$ might be used.

The treating solution for contact lenses is maintained at physiological saline, i.e., isotonic, or approximately 0.9 percent saline, or with suitable agents alone or in combination to render the solution isotonic. Hypotonic solution, e.g., tapwater, will cause the lens to adhere tightly to the cornea while hypertonic solutions (excess saline) will result in stinging, lacrimation and a red eye.

The above described components of the present invention are non-toxic and are capable of being sterilized without change in composition. Additionally, these components are safe for ophthalmic use with conventional hard contact lenses as well as the soft contact lenses.

It should be understood that the foregoing description of the amounts of the various compounds which may be used in the present invention are stated in percentage of ingredients in solution. The formulation may also take the form of one or more conventional solid dosage forms such as tablets suitable for use in a measured quantity of a suitable solvent such as water. The percentage composition of the solid dosage forms is such that when dissolved in a specified volume of water, the solution will have the percentage composition within the ranges set forth in the specification.

The method of use of the sterilizing and cleaning solution is the following. The wearer of the soft contact lenses removes them from his eyes and places them in a suitable container with sufficient amount of the composition of the present invention to cover the lenses. The lenses are allowed to soak for at least about 5 minutes to achieve 99.9 percent kill of bacteria and 2 to 8 hours to achieve 99.9 percent kill of bacterial spores, fungis and yeasts. This soaking has been shown to effectively clean and sterilize the lenses.

The word "sterilize" is used in the present invention to mean the rendering non-viable of substantially all pathogenic bacteria of the type typically found including Gram negative and Gram positive bacteria as well as fungi, except as indicated.

The present invention may be further described and illustrated with reference to the following Examples. It is to be understood that the following Examples are for the purpose of illustration and the invention is not to be regarded as limited to any of the specific compounds or formulations or conditions recited therein. Unless otherwise stated "parts" is parts by weight.

EXAMPLE I

Tests were made to determine the antimicrobial activity of an aqueous solution of 0.005 percent oxone and 1.39 percent sodium bicarbonate held at room temperature and 45°C. The test organism was *C. albicans*.

PROCEDURE 10 ml aliquots of each sample solution was inoculated to contain $10^5$ cells/ml. At intervals of 30 minutes, 45 minutes, 60 minutes, 75 minutes and 90 minutes from the time of inoculation, the remaining number of viable bacteria were quantitated by 10-fold dilutions in nutrient and Sabouraud's broth. Dilutions were plates out on Heart Infusion and Sabouraud's agar plates; incubation was for 24 hours.

RESULTS

This formulation showed no reduction of *C. Albicans* at any of the times or temperatures tested.

EXAMPLE II

EXAMPLE I was repeated, except concentrations of 0.02, 0.03, 0.04, 0.05, 0.06, 0.08 and 0.1 percent Oxone was used. Additionally, *A. niger* was used as a test organism.

Results

*C. albicans* was reduced by two logs and *A. niger* was not reduced within 6 hours contact time at an Oxone concentration of 0.1 percent. Concentrations of Oxone between 0.03 and 0.08 percent reduced *C. albicans* by 1 log.

EXAMPLE III

EXAMPLE I was repeated, except concentrations of 0.01, 0.0075 and 0.005 percent Oxone were used. Additionally, *S. aureus*, *P. aeruginosa* and *E. Coli* were used as test organisms.

Results

All of the formulations reduce *S. aureus*, *P. aeruginosa* and *E. coli* to $<10^2$ cells/ml within 6 hours. *C. albicans* and *A. niger* were not reduced.

EXAMPLE IV

EXAMPLE II was repeated, except concentrations of 0.2, 0.3, 0.4 and 0.5% Oxone were used.

Results

Oxone concentrations of 0.3, 0.4 and 0.5 reduced *C. albicans* to $<10^2$ cells/ml within 6 hours contact time, and 0.2% Oxone reduced *C. albicans* to $<10^2$ cells/ml within 8 hours. *A. niger* was only slightly reduced by these solutions within 8 hours.

EXAMPLE V

EXAMPLE I was repeated, except the formulation used was an aqueous solution of 0.005 percent oxone, 0.1 percent sodium bicarbonate and 0.835 percent sodium chloride. This formulation reduced *C. albicans* to $<10^2$ organisms/ml within 30 minutes contact time. Based on this example, it may be concluded that the presence of a chloride-releasing salt such as sodium chloride plays a significant part in the antimicrobial activity of Oxone.

EXAMPLE VI

Further tests were made to determine the antimicrobial activity of the triple salt of potassium monopersulfate (Oxone) at concentrations of 0.003, 0.004 and 0.005 percent Oxone in the presence of 0.87 percent sodium chloride and 0.035 percent sodium bicarbonate. The pH of the resultant aqueous solutions was 8.0.

Organisms used in the tests were the following:
*S. aureus*
*P. aeruginosa*
*E. coli*
*C. albicans*
*A. niger*

PROCEDURE

The procedure used in EXAMPLE I was followed, except that intervals of 30 min., 2, 4 and 6 hours were used and an additional 8-hour interval was done for *A. niger*.

Results

All three concentrations of the Oxone containing formulations tested reduced *S. aureus*, *P. aeruginosa* and *E. coli* to $<10^2$ cells/ml within 30 minutes.

The 0.005 and 0.004 percent oxone formulations reduced *C. albicans* to $<10^2$ cells/ml within 30 minutes and 2 hours respectively, and the 0.003 percent Oxone formulation reduced the same organism 2 logs within 2 hours and to $<10^2$ cells/ml within 4 hours.

*A. niger* was reduced 1 log within 30 minutes by all concentrations of the Oxone formulations, 3 logs within 2 hours by the 0.004 percent and the 0.003 percent Oxone formulations and to $<10^2$ cells/ml by the 0.005 percent Oxone formulation. Within 4 hours, the 0.003 and 0.004 percent Oxone formulations had also reduced *A. niger* to $<10^2$ cells/ml.

EXAMPLE VII

EXAMPLE V was repeated, except formulations were held in solution for 13 days, 20 days and 31 days before inoculation. Additionally, temperatures of 4°C, 23°C, 32°C and 45°C were used and *S. aureus* was also used as a test organism.

Results 1. 13 days

At all temperatures, the formulation reduced *S. aureus* to $<10^2$ organisms/ml within 30 minutes contact time. A reduced effect was shown for *C. albicans*.

2. 20 days

Compared to the 13 day readings, little significant difference in the antimicrobial activity was noted.

3. 31 days

Compared to the 20 day readings, the only significant difference in antimicrobial activity was less reduction of *C. albicans* by the 4°C solution at 30 minutes contact time

EXAMPLE VIII

Tests were made to determine the effect of a representative formulation on *B. subtilis* bacterial spores which are resistant and hard to kill. The following aqueous formulation was used:

| | |
|---|---|
| Oxone | 0.005% |
| NaHCO$_3$ | 0.0353 % |
| NaCl | 0.876% |

Procedure

Three challenge levels of the spore suspension were used: (1) $4.6 \times 10^6$, (2) $4.3 \times 10^4$ and (3) $5.9 \times 10^4$ spores per milliliter. After various contact periods, aliquots were removed and quantitated for viable spores.

Results

| Inoculum Level | Contact Time (hrs) | | | | |
|---|---|---|---|---|---|
| | 0.5 | 2 | 6 | 8 | 24 |
| $4.6\times10^6$ | $3.4\times10^6$ | $6.1\times10^3$ | $7\times10^2$ | $7\times10^2$ | $<10^2$ |
| $4.3\times10^5$ | $1\times10^5$ | $7.5\times10^2$ | $1\times10^2$ | $<10^2$ | $<10^2$ |
| $5.9\times10^5$ | $1.7\times10^4$ | $<10^2$ | $<10^2$ | $<10^2$ | $<10^2$ |

The foregoing results show excellent sporicidal activity.

EXAMPLE IX

Tests were made to evaluate in rabbit eyes the effect of Hydron soft contact lenses soaked nightly in a formulation of the present invention. The formulation tested was a solution of 0.05 percent Oxone in PO$_4$ buffer, 0.05M isotonic, pH 6.99. Nine Hydron lenses were soaked overnight in this solution and in the morning were fitted in the left eyes of nine adult New Zealand albino rabbits for approximately 6–7 hours' wearing time. Prior to resoaking each evening, the lenses were washed with an excess volume of normal saline. The rabbits were observed regularly for possible lens rejection and irritation of the eye mucosa. On the last day of study (day 28), the experimental and control eyes of each were stained with one drop of 2 percent fluorescein for observation under U.V. light for possible corneal damage. The scoring of the ocular reactions was based on the method described in "Appraisal of Safety of Chemicals in Foods, Drugs and Cosmetics," 1965, page 51.

Results

Following 28 days of daily wear, the test solution was not irritating to the eye mucosa in rabbits.

Reversible conjunctival injection of very low magnitude attributable in most part to the improper fitting of the lenses occurred intermittently in some rabbits during the study period. The fluorescein staining revealed normal corneas in every rabbit.

EXAMPLE X

EXAMPLE IX was repeated, except 0.1 percent Oxone was used instead of 0.05 percent Oxone and the test was for 30 days instead of 28.

No visible adverse reactions were noted during the entire study. However, following fluorescein staining on the last day, the corneas in the experimental eyes of three rabbits appeared stained. The lesions defined the shape of the lens in the lower aspect of the corneas and the staining density was described as hazy. The eye mucosa in the remaining six rabbits appeared clean of noticeable irritation.

EXAMPLE XI

EXAMPLE V is repeated, except the NaCl is replaced with equal molar concentrations of each of KCl, $CaCl_2$, $MgCl_2$, LiCl and $NH_4Cl$. Comparable results are obtained.

EXAMPLE XII

EXAMPLES III, IV and V are repeated except Oxone is replaced with equal molar concentrations of each of $S_2O_3^{-2}$, $SO_5^{-2}$, $S_2O_8^{-2}$, $ClO_2^-$, $ClO_3^-$ and $ClO_4^-$. Comparable results are obtained.

EXAMPLE XIII

EXAMPLES III, IV and V are repeated, except the potassium triple salt used is replaced by triple salts of each of the following: sodium, calcium, magnesium, lithium and ammonium salts. Comparable results are obtained.

EXAMPLE XIV

Tests were made to determine the antimicrobial activity of the following aqueous reducing formulation:

|  | % |
| --- | --- |
| Oxone | 0.02 |
| Sodium percarbonate | 0.007 |
| NaCl | 0.82 |
| $NaHCO_3$ | 0.10 |
| PEG-4000[1] | 0.009 |
| Polyvinylpyrrolidine | 0.0075 |
| Citric acid | 0.001 |

1. PEG-4000 Polyethlene glycyl; molecular weight about 4,000.

Procedure

The procedure of EXAMPLE I was used with the test organisms being *S. aureus*, *C. albicans* and *A. niger*.

Results

The formulation demonstrated good antimicrobial activity ($<10^2$ cells/ml) within 6 hours for all microorganisms tested. A 24-hour-old sample of the formulation did not have antimicrobial activity.

EXAMPLE XV

Tests were made to determine the antimicrobial activity of an aqueous reducing formulation. Isoascorbic acid was used as the reducing agent and Oxone was used as the oxidizing agent. The following formulation was tested:

| Oxone | 0.5% |
| --- | --- |
| Isoascorbic acid | 0.5% |
| $NaHCO_3$ | 1.0% |

The testing procedure set forth in EXAMPLE III was utilized. In all cases, *S. aureus*, *P. aeruginosa* and *E. coli* were reduced to $<10^2$ organism/ml within 1 minute contact time. *C. albicans* and *A. niger* were not substantially reduced after 15 minutes contact time.

EXAMPLE XVI

Tests were made to evaluate in rabbit eyes the effect of Bausch and Lomb soft contact lenses soaked overnight in the following aqueous formulations A and B:

| Formulation | A | B |
| --- | --- | --- |
| Oxone | 0.20% | 0.02% |
| Sodium percarbonate | 0.076% | 0.076% |
| Hydroxyethyl cellulose | — | 0.03% |

The tests were conducted in five rabbits for formulation A and five rabbits for formulation B. The lenses were worn by the rabbits 6–7 hours daily for 34 days.

Materials

Solutions A and B were indentically prepared (except as indicated) fresh daily by dissolving 0.38 parts sodium percarbonate in 100 parts by volume distilled water in a suitable container. 0.7 parts Oxone was dissolved in 100 parts by volume of distilled water in a suitable container and 2.9 parts by volume of this solution was added to the sodium percarbonate solution. Sufficient buffered NaCl solution was added to make the final solution contain 0.02 percent Oxone, 0.0076 percent sodium percarbonate, 0.22 percent $NaHPO_4.H_2O$, 0.45 percent $Na_2HPO_4$ and 0.52 percent NaCl. Additionally, sufficient hydroxyethyl cellulose was added to formulation B to bring the concentration to 0.03%.

Method

Prior to the initial soak, unused B&L lenses were boiled twice in normal saline for 30 minutes each time and examined microscopically for physical defects.

Each of the five unused B&L lenses was soaked overnight in 10.0 parts of Formulation A, then in the morning were fitted in left eyes of five adult female New Zealand albino rabbits for approximately 6–7 hours' wearing time. Forceps were used to remove the lenses and to replace them in their respective lens bottles in order to minimize handling. Each lens was assigned to individual rabbits for the duration of the study. Following each day's wear, the lenses were rinsed with normal saline and placed in clean lens bottles containing a fresh amount of soaking solution. The animals were observed regularly for possible lens rejection and irritation of the eye mucosa.

At given time intervals, the experimental and control eyes in specific rabbits were stained with one drop of 2 percent fluorescein for observation under U. V. light for possible corneal damage. The scoring of the ocular reactions was based on the method described in "Appraisal of the Safety of Chemicals in Foods, Drugs and Cosmetics," 1965, page 51. The foregoing method was repeated with Formulation B.

Observations

No discomfort was noted in any of the rabbits upon fitting the soft lenses. A mild, transient conjunctival irritation occurred intermittently in these animals during the study, apparently due to partial dehydration of the lenses resulting from infrequent blinking, thus, limiting the necessary tear fluid supply on the lenses. No lens rejection was experienced during the entire experimental period. The fluorescein staining revealed normal corneas at all examination intervals.

On days 8 and 14, one of the soft lenses used with each formulation were removed for biochemical analyses of possible protein materials. On day 34, the three ongoing lenses remained clear.

We claim:

1. A method for cleaning and sterilizing soft contact lenses comprising contacting a soft contact lens with an effective amount of an aqueous, non-toxic, isotonic solution comprising about 0.001 to about 1 percent by weight $2KHSO_5 \cdot KHSO_4 \cdot K_2SO_4$.

2. The method of claim 1 wherein the solution also contains about 0.005 to about 0.9 percent by weight NaCl.

* * * * *